May 6, 1952 W. W. KAY 2,595,793
METHOD AND APPARATUS FOR PRODUCING VACCINES
Filed Oct. 27, 1947 2 SHEETS—SHEET 1
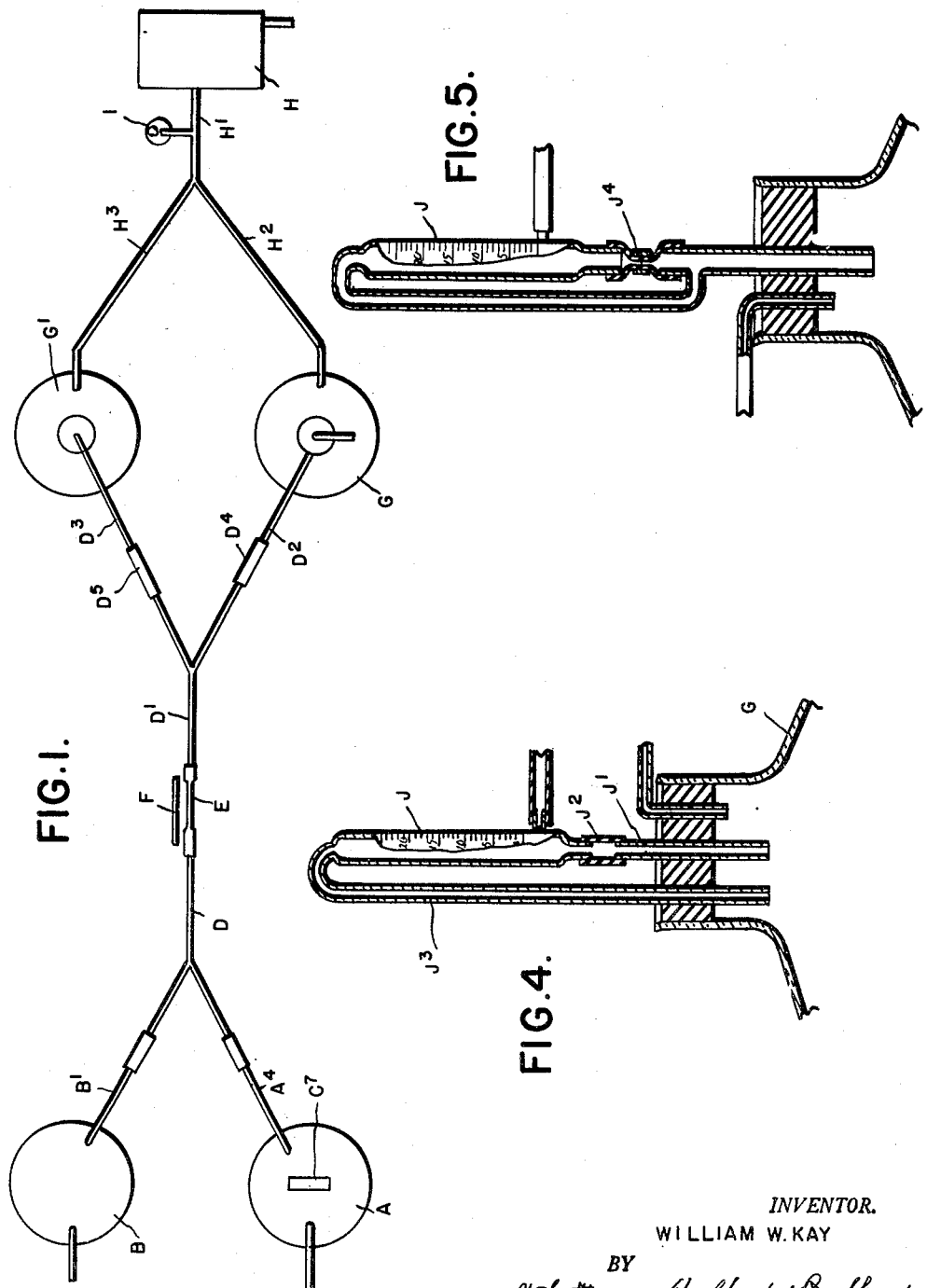
INVENTOR.
WILLIAM W. KAY
BY
ATTORNEYS May 6, 1952     W. W. KAY     2,595,793
METHOD AND APPARATUS FOR PRODUCING VACCINES
Filed Oct. 27, 1947     2 SHEETS—SHEET 2
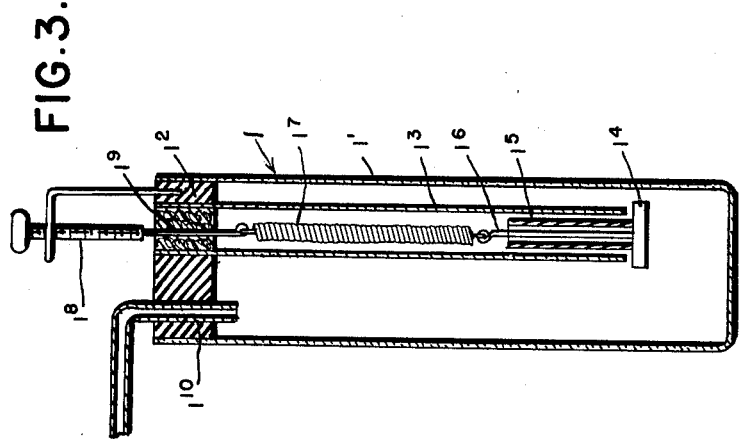
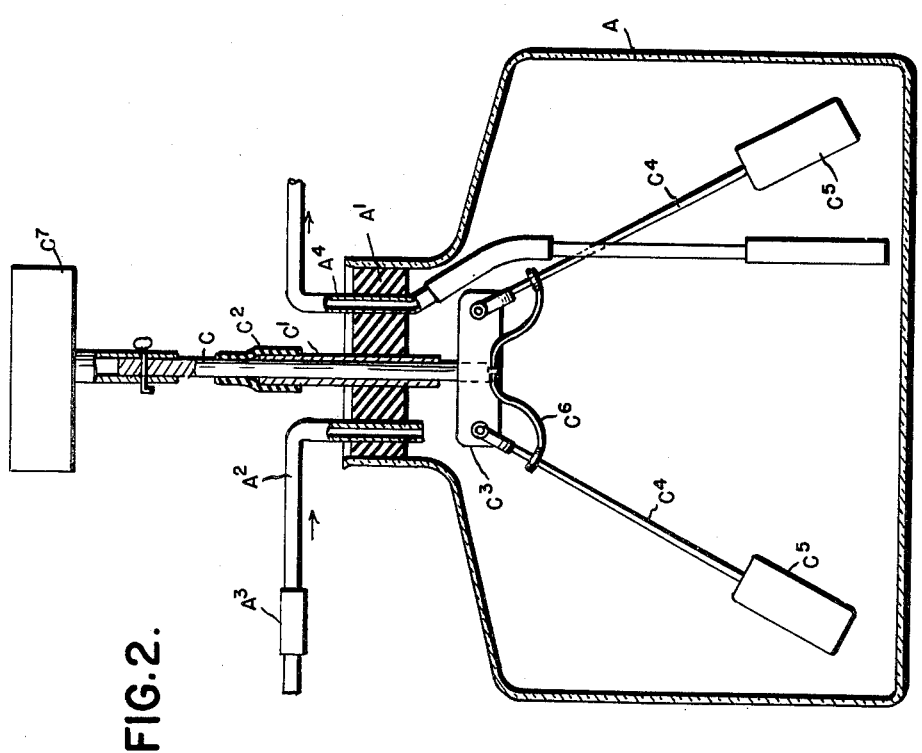
*INVENTOR.*
WILLIAM W. KAY
BY
ATTORNEYS Patented May 6, 1952

2,595,793

UNITED STATES PATENT OFFICE 2,595,793

METHOD AND APPARATUS FOR PRODUCING VACCINES

William W. Kay, Detroit, Mich., assignor to Parke, Davis & Company, Detroit, Mich., a corporation of Michigan Application October 27, 1947, Serial No. 782,428

6 Claims. (Cl. 250—45)

The invention relates to a method and apparatus for producing vaccines, the method being of the general character forming the subject matter of Patent to S. O. Levinson et al., 2,421,382, "Vaccines and Antigens and Method of Producing the Same," issued June 3, 1947. Briefly described the method of this patent comprises the exposure of a flowing stream of original vaccine material containing the live organisms to irradiation by ultra violet rays and for sufficient time to kill the organisms. The time of exposure is of importance for if the material is exposed for too long a time its immunizing characteristic is impaired. On the other hand, if the exposure is too short it may not kill all of the live organisms so that the product might even cause the disease from which its purpose is to immunize. Different vaccines vary in viscosity and, consequently, in the rate of flow through a restricted conduit under the same impelling pressure. It is necessary that the passage through which the material flows while subjected to irradiation should be very thin so as to avoid the shielding of one portion of the stream by the opacity of an intervening portion. This further varies the rate of flow with different viscosities of fluid under the same impelling pressure. Consequently, if the impelling pressure is constant (as for instance a gravity feed under the same head) the time of exposure will vary with different vaccines.

In view of conditions as above described, I have devised a method and apparatus having the following improved characteristics, first, the rate of flow of the vaccine through the exposure cell may at any time be accurately determined; second, the rate of flow of vacines having different viscosities may be maintained substantially uniform by variation of the impelling pressures; third, the vaccine material before its entrance into the flowing stream is maintained in constant agitation to avoid the settling out of any of its constituents which are held in suspension. The specific form of apparatus which I preferably employ for carrying out the improved method is shown in the accompanying drawings in which:

Fig. 1 is a diagram of the complete apparatus;

Fig. 2 is a vertical central section through the container for the unsterilized vaccine material showing the stirring means therefor;

Fig. 3 is a section through the air bleeder means;

Fig. 4 is a sectional elevation of the metering means for determining the rate of flow; and Fig. 5 is a similar section through a modified construction.

A and B are containers, respectively, for the unsterilized vaccine material and for distilled water. The container A is in the form of a narrow necked bottle closed by a stopper $A'$. An air inlet conduit $A^2$ extends through the stopper into the upper portion of the container and has at its outer end a filter $A^3$. An outlet conduit $A^4$ also passes through the stopper $A'$ extending down to near the bottom of the container. As previously described, it is essential with certain vaccine materials (such for instance as those containing brain tissue) that they should be maintained in constant agitation before entering the outlet conduit as otherwise the flowing stream would lack uniformity. However, with any stirrer or agitator which is motivated from outside the container and has a transmission shaft passing through the stopper, there is danger of air leakage around said shaft which might contaminate the material within the container. I have, therefore, devised an agitator which maintains a constant air seal. This, as shown in Fig. 2, comprises a shaft C which extends through the stopper $A'$ and engages a tubular bearing $C'$ therein. The bearing $C'$ extends above the stopper and at its upper end has sealed thereto a flexible resilient tube $C^2$ preferably of rubber. The upper end of this tube is sealed to the shaft to move therewith but the flexibility and resiliency is sufficient to permit an oscillatory rotation through an angle of 90° or thereabouts. At the lower end of the shaft C is a head $C^3$ to which are pivotally secured two arms $C^4$ having agitator blades $C^5$ at their lower ends. These arms and blades when moved into parallelism will readily pass through the neck of the container but after insertion are spread apart by a spring $C^6$ extending between the arms near the upper ends thereof. The upper end of the shaft C is connected to an oscillating motor $C^7$ of any suitable type, such for instance as that used for windshield wipers. This may be mounted on any suitable support and will suspend the shaft and agitator therefrom. Thus when the motor is in operation the blades $C^5$ are oscillated back and forth within the container A to maintain the material in constant agitation.

The subject matter of the above described agitator is disclosed and claimed in my copending application Serial No. 261,964, filed December 17, 1951, as a continuation-in-part of the instant application.

The outlet conduit $A^4$ and a corresponding outlet conduit $B'$ from the container B join in connection to a common conduit D. This leads to the exposure cell E which, together with the source of ultra violet light F, may be of any suitable construction such as described in Patent 2,421,382, above referred to. In practicing the invention we preferably employ a specially designed ultra-violet permeability irradiation chamber to produce a rapidly flowing uniform film of a suspension of micro-organisms which can be made as thin as 0.1 mm. Beyond the exposure cell E is a conduit $D'$ which connects with branch conduits $D^2$ and $D^3$. The branch $D^2$ leads to a container G for receiving the properly sterilized product. The branch $D^3$ leads to a container $G'$ for receiving waste product obtained during adjustment of the apparatus. Valves $D^4$ and $D^5$, respectively, in the branches $D^2$ and $D^3$ serve to alternately cut off the receiving containers G and $G'$.

The impelling force used for causing flow of fluid through the conduits is differential gaseous pressure or specifically differential air pressure. This is obtained by reducing the air pressure within the receiving containers G and $G'$ so as to obtain a predetermined differential. As shown a chamber H under constant vacuum is connected by a conduit $H'$ with branch conduits $H^2$ and $H^3$ leading, respectively, to the containers G and $G'$. However, the pressures within these chambers G and $G'$ should be varied with different vaccines to compensate for their respective viscosities and so as to produce a substantial constant rate of flow through the cell E. For this purpose an air bleeder I is connected with the conduit $H'$ and is adjustable to admit varying quantities of air to said conduit thereby modifying the vacuum therein and in the containers G and $G'$. The construction of air bleeder preferably employed, as shown in Fig. 3, comprises an outer transparent casing $I'$ closed by a stopper $I^2$, a tube $I^3$ passing through the stopper, a valve disc $I^4$ seated on the inner end of the tube $I^3$ and having a guide stem $I^5$ within said tube. A tension member $I^6$, including a spring $I^7$, is arranged within the tube $I^3$ being connected at one end to the valve $I^4$ and at its opposite end to an adjusting screw $I^8$. There is also an air filter $I^9$ in the tube through which the tension member passes. $I^{10}$ is a conduit passing through the stopper $I^2$ communicate with the interior of the casing $I'$ and at its outer end connecting to the conduit $H^1$. With the construction as just described, the screw $I^8$ may be adjusted to vary the resilient pressure for seating the valve $I^4$, such pressure being opposed by atmospheric pressure passing through the tube $I^3$. Thus the quantity of air admitted to the conduit $H'$ through the bleeder may be varied to obtain just the desired degree of vacuum in the containers G and $G'$.

To determine what vacuum is required for producing the desired rate of flow of the vaccine material through the exposure cell E, I have devised a meter of the following construction, illustrated in Fig. 4. This meter may be connected with the receiver G or to the inlet conduit to said receiver. It is also convenient to connect a like meter with receiver $G'$. The meter includes a transparent vertically extending tube J calibrated in cubic centimeters or other units of measurement which can be used to indicate directly the rate of flow through E, for a given fluid and a given degree of vacuum. The lower end of the calibrated tube J connects with a tube $J'$ extending into the container G but with a valve $J^2$ therebetween, such as a pinch valve or an adjustable pinch clamp or stop cock which will restrict, or even completely cut off, the flow. A tube, or an arm, $J^3$, leads from the upper end of tube J down into container G and thereby serves as a bypass or overflow arm. The conduit $D^2$ is connected into the tube J below the calibrated portion thereof. To measure the flow, the valve $J^2$ is closed, whereupon the fluid discharged from the conduit $D^2$ will rise in the calibrated portion of the tube J at the same rate that it will flow into G when $J^2$ is open. By timing this rise, the rate of flow from D, and hence the rate of flow through E and into G, can be accurately determined. The valve $J^2$ is then opened and the fluid permitted to enter the receiver G.

A modified construction for the flow meter is shown in Fig. 5 and is the same as that for Fig. 4 with the exception that the bypass tube $J^3$ connects the upper end of the tube J with the tube $J'$ below the valve $J^4$. This modification, like that of Fig. 4, can also be regulated at $J^4$ to restrict flow into container G so that liquid can flow from conduit $D^2$ through $J^4$ at a steady rate either without rising into tube J or while the level of liquid in calibrated tube J remains at a predetermined point corresponding to a desired rate of flow through E. If, for any reason, the rate of flow through E and $D^2$ is increased temporarily, fluid will enter the calibrated portion of tube J or its level will rise above the predetermined point, depending upon the degree of restriction originally established at $J^4$. However, the rise in J will not ordinarily become excessive because it will establish a hydrostatic head which, supplementing the vacuum, will discharge fluid through $J^4$ as fast as it is flowing through the conduit $D^2$. After such temporary rise and stable conditions are again established in the system of apparatus, the level of fluid in J will again indicate the steady rate of flow through exposure cell E. Such fluctuations in flow are best indicated by making use of a predetermined point for level of fluid in J since reductions in rates of flow through E can be observed at J by a lowering of the fluid level as well as a rise when flow increases. Adjusting of flow rates through E is done at the air bleeder valve I, but the correct rate of flow is re-established by bringing the fluid level in J to its originally determined point.

I find it convenient to first run sterile distilled water or sterile physiological saline solution through conduits $B'$, D, $D'$ and $D^3$ of the apparatus, including a meter attached to $G'$ like that attached to G, to establish a rate of flow through E which is satisfactory. The level of fluid in J at the satisfactory flow rate is then noted. Thereafter, the flow of distilled water or saline is cut off at $B'$ and the fluid to be irradiated is flowed through conduits $A^4$, D, $D'$ and $D^2$ from container A into G while the air bleeder is adjusted, if need be, to make the rate of flow of fluid through the meter attached to G substantially the same as it was through the corresponding $G'$ meter during satisfactory flow of distilled water or saline solution. By this procedure, one can from the start establish a satisfactory rate of flow of liquid to be irradiated, mainly because most fluids to be irradiated will have flow rates close to that of water or physiological saline.

What I claim as my invention is:

1. In a method of irradiating vaccines wherein a vaccine flows at relatively high velocity in a thin film past a source of ultraviolet radiation;

the steps of propelling a sterile preliminary liquid of a viscosity similar to that of the vaccine to flow in a film past said source by means of differential gaseous pressure, determining the rate of flow of said liquid in said film, adjusting the pressure differential to obtain a predetermined rate of flow, discontinuing the flow of said liquid and causing the vaccine to flow under the same differential pressure whereby the rate of flow of vaccine in said film will be substantially equal to the rate of flow of said liquid, and exposing the vaccine to ultraviolet radiation from said source as it flows in said film.

2. In a method of irradiating vaccines wherein a vaccine flows at relatively high velocity in a thin film through a transparent cell adjacent a source of ultraviolet radiation, the steps of propelling a sterile preliminary solution of viscosity similar to that of the vaccine through the cell by means of differential gaseous pressure, determining the rate of flow of said solution through said cell, adjusting the pressure differential to obtain a predetermined rate of flow, discontinuing the flow of said solution while causing the vaccine to flow through said cell under the same differential pressure whereby the rate of flow of said vaccine will be substantially equal to the rate of flow of said solution, and exposing the vaccine to ultraviolet radiation from said source as it flows through said cell.

3. A method of irradiating vaccines in accordance with claim 2, wherein the vaccine is constantly agitated to assure substantially constant turbidity before entering said cell.

4. An apparatus for irradiating vaccines comprising a container for original vaccine communicating with a receiving vessel for irradiated vaccine by means of a conduit having a transparent cell therein, a container for sterile solution also communicating by means of said conduit with a receiving vessel for said solution, said receiving vessels being subjected to an equal degree of evacuation, control means for preventing flow of vaccine through said cell and into its receiving vessel while permitting flow of sterile solution through said cell and into its receiving vessel, means alternatively operable with said control means to cut off the flow of said solution while permitting flow of vaccine from its container through said cell and into its receiving vessel, means for modifying the vacuum to obtain a predetermined rate of flow through said cell, and a source of ultraviolet radiation adjacent said cell for irradiating said vaccine.

5. An apparatus for irradiating vaccines comprising a container for original vaccine communicating with a receiving vessel for irradiated vaccine by means of a conduit having a transparent cell therein, a container for sterile solution also communicating by means of said conduit with a receiving vessel for said solution, said receiving vessels being subjected to an equal degree of evacuation, control means for preventing flow of vaccine through said cell and into its receiving vessel while permitting flow of sterile solution through said cell and into its receiving vessel, means alternatively operable with said control means to cut off the flow of said solution while permitting flow of vaccine from its container through said cell and into its receiving vessel, means for accurately determining the rate of flow of fluid through said cell, means for modifying the vacuum to obtain a predetermined rate of flow through said cell, and a source of ultraviolet radiation adjacent said cell for irradiating said vaccine.

6. Apparatus in accordance with claim 4 wherein said container for original vaccine contains means for agitating the vaccine to maintain uniform turbidity of the vaccine flowing through said cell.

WILLIAM W. KAY.

REFERENCES CITED

The following references are of record in the file of this patent:

UNITED STATES PATENTS

| Number | Name | Date |
|---|---|---|
| Re. 14,100 | Kirby | Apr. 4, 1916 |
| 1,016,017 | Koltschanoff | Jan. 30, 1912 |
| 1,191,916 | Brooks et al. | July 18, 1916 |
| 1,769,941 | Bre Miller | July 8, 1930 |
| 1,966,547 | Goode | July 17, 1934 |
| 2,235,138 | Billetter | Mar. 18, 1941 |
| 2,405,704 | Matuszak | Aug. 13, 1946 |
| 2,421,382 | Levinson et al. | June 3, 1947 |

OTHER REFERENCES

"A New Method for the production of Potent Inactivated Vaccines With U V Irradiation," Levinson et al., reprint from "The Journal of Immunology," vol. 50, #6, June 1945. (Copy in Div. 54.)